June 1, 1926.  
E. THOMSON  
1,587,445  
ELECTRIC WELDING OR RIVETING  
Filed Oct. 25, 1924
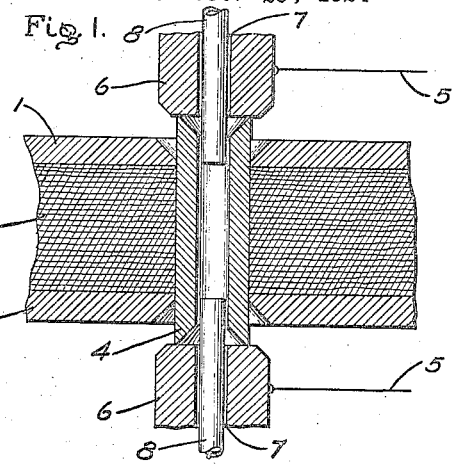
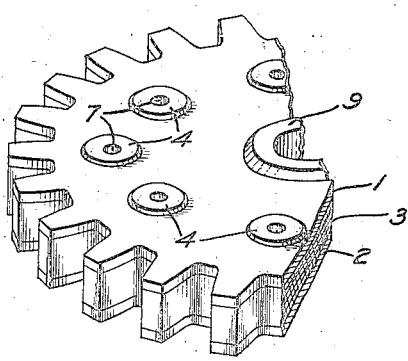
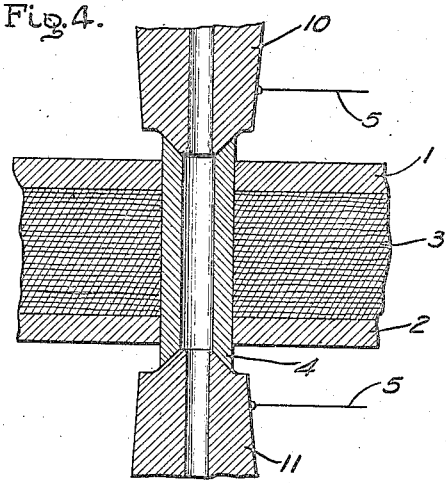
Inventor  
Elihu Thomson  
by *Alexander S. Lent*  
His Attorney Patented June 1, 1926.

1,587,445

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC WELDING OR RIVETING.

Application filed October 25, 1924. Serial No. 745,889.

My invention relates to the electric welding or riveting of metal parts in contiguity to materials or parts likely to be injured by the application of heat, and has for its object the provision of means whereby such metal parts may be electrically welded or riveted together without injury to the materials or parts associated therewith.

Where metal parts are required to be electrically welded or riveted together while in contact with cotton or other fabric, for example, difficulty is encountered due to the fact that heating of the metal is apt to produce burning of the fabric. Thus, in the manufacture of gears comprising a body of fabric held between metal plates which are maintained in contact with opposite sides of the fabric body by means of rivets or the like, electric welding or riveting is likely to overheat and char the fabric. In accordance with my invention, this difficulty is obviated by interconnecting the metal plates, or other parts to be secured together, through a tubular member which is arranged to serve as a conduit for the circulation of a cooling medium while it is being heated or upset to compress and hold the fabric core between the plates. This method of riveting is of great advantage in that it permits circulation of the cooling fluid at a pressure which ensures its intimate contact with the heated parts.

My invention will be better understood from the following description when considered in connection with the accompanying drawing and its scope will be pointed out in the appended claims.

Referring to the drawing, Figs. 1, 2 and 3 are fragmentary views showing the construction of a gear in accordance with my invention; and Fig. 4 shows a modified arrangement of the heating electrodes through which cooling fluid is transmitted to and from the parts which are being heated.

Fig. 1 shows a pair of metal plates 1 and 2 which are placed in contact with opposite sides of a fabric core 3. The plates are forced against the core by suitable means, not shown, which may, for example, be a hydraulic press. Tubular members or rivets 4 are applied, while the plates are under pressure, to hold the core compressed when the gear is removed from the press. Current for heating the ends of the member 4 is supplied through leads 5 and electrodes 6. Pressure may be applied to the electrodes 6 in any suitable manner for the purpose of upsetting the ends of the member 4 and forcing the heated metal into contact with the plates 1 and 2 as shown by Fig. 2. The ends of the member 4 may be chamfered to give them a high resistance and facilitate the heating process. If desired, the openings in the plates 1 and 2 may also be chamfered at their outer edges to ensure the production of a strong and neat joint.

Fluid for cooling the heated parts in a manner to prevent injury to the fabric core is transmitted to the member 4 through openings 7 of the electrodes 6 and the pipes 8 which are arranged to be inserted into these openings. The pipes 8 may be connected to any suitable source of cooling fluid. In order to effect efficient cooling, it is desirable that the cooling fluid be circulated under pressure. This is especially true in the case of a liquid such as water and like fluids which are apt to be converted into a spheroidal state and to become very poor conductors of heat when brought into contact with a highly heated surface at atmospheric pressure. Where such cooling fluids are used, the illustrated arrangement is of especial advantage in that it renders possible the circulation of the cooling fluid at pressures sufficiently high to ensure that it is brought into intimate contact with the heated parts.

Fig. 3 is a fragmentary view of a completed gear. As indicated by this figure, both the central bushing 9 of the gear and the rivets 4, which are required to hold the fabric compressed between the plates, may have their ends upset and brought into contact with the plates in the same manner.

Fig. 4 shows a modification in which the heating electrodes 10 and 11 are formed to fit into the ends of the tubular member, thus obviating the necessity of extending the cooling fluid pipes through the electrodes.

It will be readily understood by those skilled in the art that my invention may be embodied in many forms other than those shown and described. For this reason, I do not wish to be restricted to the particular forms of construction disclosed herein by way of example for the purpose of setting forth my invention in accordance with the patent statutes. The terms of the appended claims are, therefore, not limited to the precise structure disclosed but are intended to cover all changes and modifications within the true spirit and scope of my invention.

What I claim as new and desire to secure by Letters Patent of the United States is:

1. The method of securing parts by means of a hollow rivet passed therethrough which comprises passing a heating current into the rivet to heat an end thereof, circulating a cooling fluid through the opening in the rivet to maintain the body portion of the rivet cool, and applying pressure to upset the heated end portion of the rivet.

2. The method of operating a riveting machine comprising hollow pressure-exerting electrodes to upset a hollow rivet which comprises placing the rivet between the electrodes, passing a heating current from said electrodes into the rivet while circulating a cooling medium through the electrodes and rivet to cool the body portion of the rivet, and exerting pressure upon the rivet to upset the same.

3. The process of heating metal parts in contiguity to materials apt to be injured by the application of heat which consists in transmitting heating current through said parts, and circulating through said parts a cooling fluid apt to assume a spheroidal state and maintaining the cooling fluid under sufficient pressure to prevent the cooling fluid from assuming such state.

4. The process of heating metal parts in contiguity to materials apt to be injured by the application of heat which consists in transmitting heating current through said parts, and circulating a cooling medium under pressure through said parts for protecting said materials.

In witness whereof, I have hereunto set my hand this 22nd day of October 1924.

ELIHU THOMSON.